June 27, 1944.   C. B. ALEXANDER   2,352,169
COMBINATION MATHEMATICAL INSTRUMENT
Filed Dec. 7, 1943

Inventor:
Charles Bertrand Alexander

Patented June 27, 1944

2,352,169

UNITED STATES PATENT OFFICE 2,352,169

COMBINATION MATHEMATICAL INSTRUMENT

Charles Beltrand Alexander, Melbourne, Victoria, Australia

Application December 7, 1943, Serial No. 513,288
In Australia July 2, 1942

2 Claims. (Cl. 33—75)

This invention has been devised with the object of providing in a compact and durable form a combination mathematical instrument which will be found of great service and convenience to draughtsmen in the architectural, engineering and allied professions, as also to teachers and students at technical colleges and other educational establishments for the purpose of measuring and laying down distances and angles on paper when engaged in drawing and plotting.

In the improved mathematical instrument there are combined a straight rule having a graduated scale on its surface; a protractor which is fitted to and is slidably adjustable longitudinally on the straight rule; a pointer adapted to be moved into register with the graduated markings of the protractor; an angle rule the movements of which are synchronous with those of the pointer, and means for securely holding the angle rule in the adjusted positions at which it is set.

Reference is made to the accompanying drawing which illustrates one practical embodiment of the invention and wherein.

Figure 1:
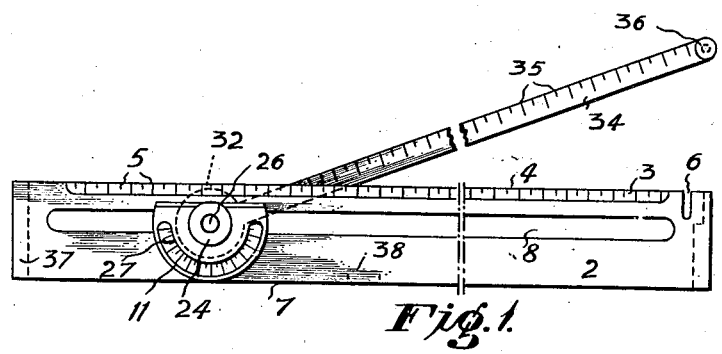
Fig. 1 is a view in plan of the improved combination mathematical instrument.
Figure 2:
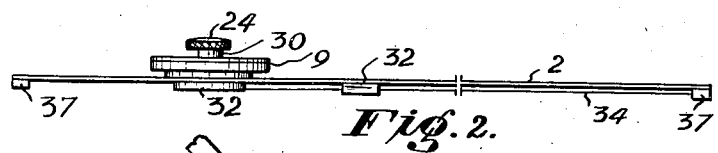
Fig. 2 is a side elevation of the same.
Figure 3:
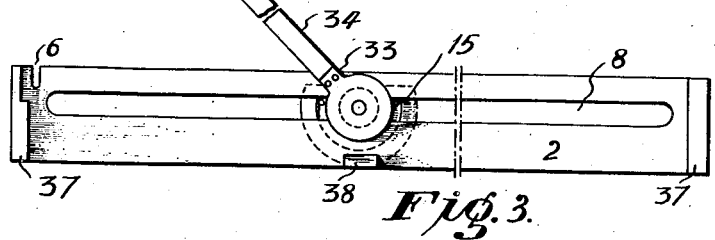
Fig. 3 is an underside plan of the instrument.
Figure 5:
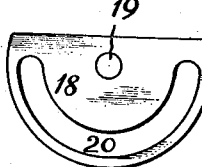
Fig. 5 is a plan view of the cover plate of the protractor.
Figures 4, 6, 7:
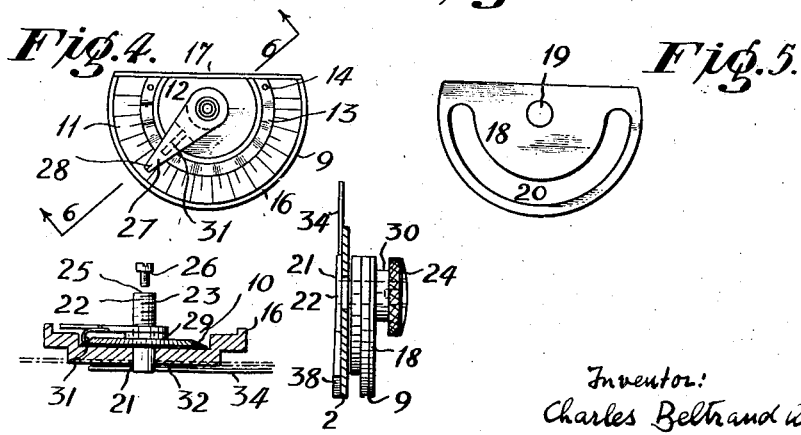
Fig. 4 is a view in plan on enlarged scale of the protractor from which the copper plate has been removed.
Fig. 6 is a sectional view taken on the line 6—6 of Fig. 4.
Fig. 7 shows in side view the protractor with its cover plate in position and illustrating the means for actuating the angle rule and the pointer of the protractor.

In these views 2 designates a straight rule which is of suitable length and width and is bevelled at 3 at its forward marginal portion to provide a smooth, rigid edge 4 for guiding a pen or pencil in drawing or plotting. The bevelled portion of the rule has on its upper surface an appropriate scale indicated by 5, and at the right-hand side of said bevelled portion there is an open-ended slot 6, the purpose of which will be hereinafter explained.

Formed longitudinally in the rule 2 closer to its front edge 4 than to its rear edge 7 is an elongated slot 8 which is in parallelism with the said edge 4 and extends nearly the full length of the rule. The purpose of this elongated slot is to provide a guide for a protractor which is permanently attached to the rule and is adapted to be adjusted thereon for being slidably moved in a longitudinal direction.

The protractor body 9 is formed with a deep segmental recess 10 to thereby provide a raised arcuate member 11 and a flat horizontal portion 12 whereon is seated a bevelled arcuate member 13 which is fastened concentrically within the said arcuate member 11 by means of rivets or screws 14. The arcuate member 11 has on its upper surface radial graduated spaces and radial lines with markings as customarily are provided on protractors, and the bevelled arcuate member 13 has on its upper surface a multiplicity of regularly spaced radial indentations, not shown in the drawing, which correspond with the radial lines marked on the protractor member 11. On the underside of the flat portion 12 of the protractor body and preferably formed integrally therewith is a slide block 15 which is fitted accurately and snugly within the guide slot 8 of the straight rule 2.

The arcuate protractor member has an upward rim 16 at its outer edge and the chord of said member has an upward flange 17 which is slightly higher than said rim to provide a seating for a cover plate 18 which abuts against said flange and lies flush therewith. This cover plate has a central hole 19 to facilitate its fixture when the components of the protractor are being assembled and an arcuate slot 20 through which the graduated spaces and markings of the protractor can be clearly read.

A hole 21 is formed through the flat portion 12 of the protractor body and through the slide block 15 on the underside of said flat portion to serve as a bearing for a vertical spindle 22. This spindle is screw-threaded exteriorly at its upper end portion 23 for engagement with a knurled operating head 24, and it has a vertical tapped hole 25 to threadedly engage a locking screw 26 passed through the tapped hole in said knurled head.

A tapered protractor pointer 27 having at its outer end a central indentation or line 28 is fixedly secured at its inner end onto the spindle 22 between a collar 29 and a collar 30 which latter is formed integrally with the knurled head 24.

The pointer 27 is adapted to be moved across the upper surface of the arcuate protractor member 11 by manipulation of the knurled head 24 to impart rotational movements in required direction to the spindle 22. Affixed to the underneath surface of the pointer is a spring claw 31 or the like which in the movements of the pointer successively engages with a clicking sound the radial indentations of the bevelled arcuate member 13 and thereby gives an audible indication when the pointer is being moved or has been moved to a selected degree in the graduations appearing on the protractor.

A discoid plate 32 is fixed onto the lower end of the spindle 22 so as to be rotatable therewith. The said plate abuts against the underneath surface of the rule 2 and it is so dimensioned that it prevents accidental detachment of the slidably fitted protractor. Securely fastened at 33 to the rotatable plate 32 is an angle rule 34 having on its upper surface a scale 35. The said angle rule has at its free end a headed stud 36 adapted for engagement within the open-ended slot 6 formed in the end of the straight rule 2, whenever the said angle rule is not required for use and is folded downwardly.

On the underneath surface of the straight rule there are end rests 37 of forwardly tapering configuration and a rear central rest 38 for the purpose of maintaining the instrument slightly above the drawing paper and thus give sufficient clearance to ensure unrestricted slidable movements of the protractor and free angular movements of the rule 34.

In the use of the instrument, the protractor is freely slid in either direction to a required position on the straight rule 2, and rotational movement is imparted to the spindle 22 carrying the pointer 27 by manipulation of the knurled operating head 24. Rotational movement of the spindle 22 imparts corresponding movement to the discoid plate 32 to which the angle rule 34 is secured. When the said angle rule has been moved to the required angular position the knurled head 24 is turned by one hand while the protractor is being held by the other hand. This knurled head is capable of slight rotational movement on the spindle 22 and in consequence it can be turned to press upon the cover plate 18 and thereby clamp the said angle rule in the position at which it has been set.

What I do claim is:

1. A combination mathematical instrument comprising, a straight rule, a protractor slidably adjustable in longitudinal direction on said rule, a protractor spindle, a pointer fast on said spindle adapted to register with the graduated markings on the protractor, a cover plate on said protractor, a knurled head threadedly engaging the upper end of said spindle, and an angle rule fixedly connected to the opposite end of said spindle, said knurled head having limited rotational movement on said spindle and adapted by pressing on said cover plate to exert clamping pressure upon said angle rule.

2. An improved combination mathematical instrument according to claim 1, wherein a discoid plate is fixed to the spindle of the protractor and the angle rule is secured to said discoid plate.

CHARLES BELTRAND ALEXANDER.